United States Patent
Morris et al.

(10) Patent No.: US 6,992,872 B2
(45) Date of Patent: Jan. 31, 2006

(54) CIRCUIT BREAKER INCORPORATING FAULT LOCKOUT PROTECTION

(75) Inventors: Robert A. Morris, Burlington, CT (US); Edgar Yee, Chapel Hill, NC (US)

(73) Assignee: General Electric Company, Schenectady, NY (US)

( * ) Notice: Subject to any disclaimer, the term of this patent is extended or adjusted under 35 U.S.C. 154(b) by 5 days.

(21) Appl. No.: 09/682,730

(22) Filed: Oct. 10, 2001

(65) Prior Publication Data

US 2002/0012210 A1 Jan. 31, 2002

Related U.S. Application Data

(63) Continuation of application No. 09/473,420, filed on Dec. 29, 1999, now Pat. No. 6,657,837.

(51) Int. Cl.
*H02H 3/00* (2006.01)
*G01R 31/14* (2006.01)

(52) U.S. Cl. .......................................... 361/72; 324/509
(58) Field of Classification Search .................... 361/72, 361/73, 74, 75, 63, 64, 65, 66, 67; 324/509
See application file for complete search history.

(56) References Cited

U.S. PATENT DOCUMENTS

| | | | |
|---|---|---|---|
| 4,301,434 A | 11/1981 | Castonguay | 335/20 |
| 4,331,915 A | 5/1982 | Fielden | 324/110 |
| 4,420,721 A | 12/1983 | Dorey et al. | 324/110 |
| 4,497,010 A | 1/1985 | Funahashi | 361/93 |
| 4,589,052 A | 5/1986 | Dougherty | 361/94 |
| 4,672,501 A | 6/1987 | Bilac et al. | 361/96 |
| 4,689,570 A | 8/1987 | Ohgaki et al. | 324/418 |
| 4,754,247 A | 6/1988 | Raymont et al. | 335/202 |
| 4,810,950 A | 3/1989 | Young | 324/57 PS |
| 4,924,342 A * | 5/1990 | Lee | 174/DIG. 17 |
| 4,945,443 A | 7/1990 | DeBiasi et al. | 361/93 |
| 5,091,690 A | 2/1992 | D'Antonio et al. | 324/107 |
| 5,399,955 A | 3/1995 | Glaser et al. | 323/208 |
| 5,450,328 A | 9/1995 | Janke et al. | 364/482 |
| 5,461,300 A | 10/1995 | Kappenman | 323/215 |
| 5,514,964 A | 5/1996 | Benesh et al. | 324/509 |

(Continued)

OTHER PUBLICATIONS de Oliveira, A. et al., Practical Approaches for AC System Harmonic Impedance Measurements, IEEE Transactions on Power Delivery, vol. 6, No. 4, Oct. 1991, pp. 1721–1726.

(Continued)

*Primary Examiner*—Gregory J. Toatley, Jr.
*Assistant Examiner*—Danny Nguyen
(74) *Attorney, Agent, or Firm*—Cantor Colburn LLP

(57) ABSTRACT

A method of protecting multiple feeder circuits fed from a shared electrical distribution system is provided. The method includes providing a bypass line, providing bypass switches in the bypass line, providing a fault lockout protection controller coupled to the bypass line. The bypass line bypasses separable circuit breaker contacts in each of the feeder circuits between a load side and a line side of the electrical distribution system. The bypass switches selectively couple each of the feeder circuits to the bypass line. The method further includes controlling the fault lockout protection controller to detect the existence of a fault condition on the load side of the feeder circuit selectively coupled to the bypass line prior to closing the separable circuit breaker contacts of the feeder circuit; and controlling the fault lockout protection controller to prevent closure of the separable circuit breaker contacts upon detection of the fault condition.

26 Claims, 7 Drawing Sheets

U.S. PATENT DOCUMENTS

| | | | |
|---|---|---|---|
| 5,534,782 A | 7/1996 | Nourse | 324/500 |
| 5,587,662 A | 12/1996 | Kelley et al. | 324/713 |
| 5,594,748 A | 1/1997 | Jabr | 372/38 |
| 5,631,569 A | 5/1997 | Moore et al. | 324/713 |
| 5,631,798 A | 5/1997 | Seymour et al. | 361/102 |
| 5,650,907 A | 7/1997 | Ishii et al. | 361/93 |
| 5,657,193 A | 8/1997 | Purkayastha | 361/23 |
| 5,691,871 A | 11/1997 | Innes | 361/96 |
| 5,701,080 A | 12/1997 | Schumacher et al. | 324/539 |
| 5,701,226 A * | 12/1997 | Gelbien et al. | 361/63 |
| 5,808,848 A | 9/1998 | Pollman et al. | 361/93 |
| 5,818,245 A | 10/1998 | Allfather | 324/707 |
| 5,931,289 A * | 8/1999 | Chou | 200/288 |
| 5,936,817 A * | 8/1999 | Matsko et al. | 361/72 |
| 5,973,899 A * | 10/1999 | Williams et al. | 361/72 |
| 6,028,945 A | 2/2000 | Gayle | 381/120 |
| 6,208,120 B1 * | 3/2001 | Gibbs | 322/59 |
| 6,330,140 B1 * | 12/2001 | Wilson-Jones et al. | 324/527 |
| 6,456,097 B1 | 9/2002 | Sutherland | 324/713 |

OTHER PUBLICATIONS

Samesima, M.I. et al., Frequency Response Analysis and Modeling of Measurement Transformers Under Distorted Current and Voltage Supply, IEEE Transactions on Power Delivery, vol. 6, No. 4, Oct. 1991, pp. 1762–1768.

Frankenberg, W. et al., Assessment of Harmonic Interference From Shipborne Converter Equipment for Compliance With Mains Quality Requirements, IEEE Transactions on Power Delivery, vol. 6, No. 4, Oct. 1991, pp. 1735–1739.

Czarnecki, L.S. et al, On–Line Measurement of Equivalent Parameters for Harmonic Frquencies of a Power Distribution System and Load, IEEE Transactions on Instrumentation and Measurement, vol. 45, No. 2, Apr. 1996, pp. 467–472.

Rhode, J.P. et al, Complete Characterization of Utilization–Voltage Power Sytem Impedance Using Wideband Measurement, 1996 IEEE Industrial and Commercial Power Systems Technical Conference Record, pp. 123–130.

* cited by examiner

CIRCUIT BREAKER INCORPORATING FAULT LOCKOUT PROTECTION

CROSS REFERENCE TO RELATED APPLICATIONS

This application is a continuation in part of commonly owned and assigned U.S. patent application Ser. No. 09/473,420 filed on Dec. 29, 1999 now U.S. Pat. No. 6,657,837, the contents of which are incorporated reference herein.

BACKGROUND OF INVENTION

This invention relates to circuit breakers, and, more particularly, to a fault lockout protection incorporated in a circuit breaker.

In accordance with the terms used throughout the circuit protection industry, circuit breaker "making capacity" describes the ability to close a circuit breaker onto a high level short circuit current associated with a low power factor. The so-called "making current" peak value, depending on switching transients and the point on the associated voltage wave closing angle for power factors between 0.15 and 0.20 is in the order of 2.309 to 2.183 times the rms current value. With a low power factor equal to approximately 0.04, the making current peak value can reach 2.663 times the rms current value. An rms fault current level of 100 KA, for example, would result in closing the circuit breaker onto a peak short circuit current of roughly 230 KA for 0.15 power factor. Most industrial-rated circuit breakers, however, are designed to interrupt, that is break, overload short circuit values that are significantly less than 150 KA. Accordingly, components within the circuit breaker operating mechanism are made of large mechanical structure to withstand the high mechanical and thermal stress associated with such short circuit currents. In addition, arcing must be more precisely controlled, the latching sequence must be more precise, and the degree of contact bounce that can be tolerated must be reduced to accommodate the short circuit currents.

Since the short circuit interruption-breaking current values occurring within an industrial electrical distribution system are much lower than peak closing short circuit current values, eliminating the need for a circuit breaker operating mechanism to close and latch onto a short circuit fault would subject the circuit breaker contacts and closing mechanism to considerably less mechanical and thermal stress. Therefore, eliminating the need for the circuit breaker to close and latch onto a short circuit fault would obviate the need for a stronger latching mechanism and would relax tolerances on the control of arcing, the latching sequence, and the degree of contact bounce.

SUMMARY OF INVENTION

In an exemplary embodiment, a circuit breaker with fault lockout protection includes a plurality of contacts forming part of an electrical distribution circuit. The contacts are separable to isolate a load side of the electrical distribution circuit from a line side of the electrical distribution circuit. The line side has a line voltage. A test current is induced on the load side of the electrical distribution circuit by a test voltage, which is less than the line voltage. A sensing device is arranged for sensing the test current in the load side of the electrical distribution circuit. The sensing device provides a sensed signal indicative of an electrical characteristic of the test current. A processor is arranged to detect a fault condition on the load side of the electrical distribution circuit in response to the sensed signal. The processor generates a fault lockout signal when the fault condition is detected. A fault lockout device receives the fault lockout signal and prevents closure of the plurality of contacts in response to the fault lockout signal.

In an alternate exemplary embodiment, a method of protecting multiple feeder circuits fed from a shared electrical distribution system is provided. The method includes providing a bypass line, providing bypass switches in the bypass line, providing a fault lockout protection controller coupled to the bypass line. The bypass line is configured to bypass separable circuit breaker contacts in each of the feeder circuits between a load side and a line side of the electrical distribution system. The bypass switches are configured to selectively couple each of the feeder circuits to the bypass line. The method further includes controlling the fault lockout protection controller to detect the existence of a fault condition on the load side of the feeder circuit selectively coupled to the bypass line prior to closing the separable circuit breaker contacts of the feeder circuit; and controlling the fault lockout protection controller to prevent closure of the separable circuit breaker contacts upon detection of the fault condition.

In yet another exemplary embodiment, an electric motor control center is provided. The electric motor control center comprises electric motors, a motor starter for each of the electric motors, a bypass line, bypass switches in the bypass line, a logic sequence controller, and a fault lockout protection controller. The electric motors are electrically connectable to a common electrical distribution system by the motor starters. The bypass line is configured to bypass the motor starters between a load side and a line side of the common electrical distribution system. The bypass switches are configured to selectively couple each of the electric motors to the bypass line. The logic sequence controller is configured to control opening and closing the motor starters and the bypass switches. The fault lockout protection controller is coupled to the bypass line. Thus, the fault lockout protection is configured to selectively detect the existence of a fault condition on the load side at each of the electric motors prior to closing the motor starters, and to selectively prevent closure of the motor starter for each of the motors upon detection of the fault condition.

In another exemplary embodiment, a circuit breaker is provided. The circuit breaker comprises an over-center toggle mechanism, separable breaker contacts, and a fault lockout protection controller. The over-center toggle mechanism is configured to move between an open position and a closed position. The separable breaker contacts are movable by the over-center toggle mechanism between the open position and the closed position. The contacts are configured to connect a load side to a line side of an electrical distribution system in the closed position and to disconnect the load side from the line side in the open position. Thus, the fault lockout protection controller is configured to detect the existence of a fault condition on the load side, and prevents closure of the separable breaker contacts upon detection of the fault condition.

In another exemplary embodiment, a method of protecting a circuit is provided. The method includes blocking separable contacts of an electrical distribution system from closing; initiating a fault detection sequence in a fault lockout protection controller, the fault lockout protection controller being configured to detect the existence of a fault condition on a load side of the separable contacts; leaving the separable contacts blocked from closing upon detection that the fault condition is present; and unblocking the separable contacts from closing upon detection that the fault condition is not present.

The above-described and other features and advantages of the present invention will be appreciated and understood by those skilled in the art from the following detailed description, drawings, and appended claims.

DETAILED DESCRIPTION

Figure 1:
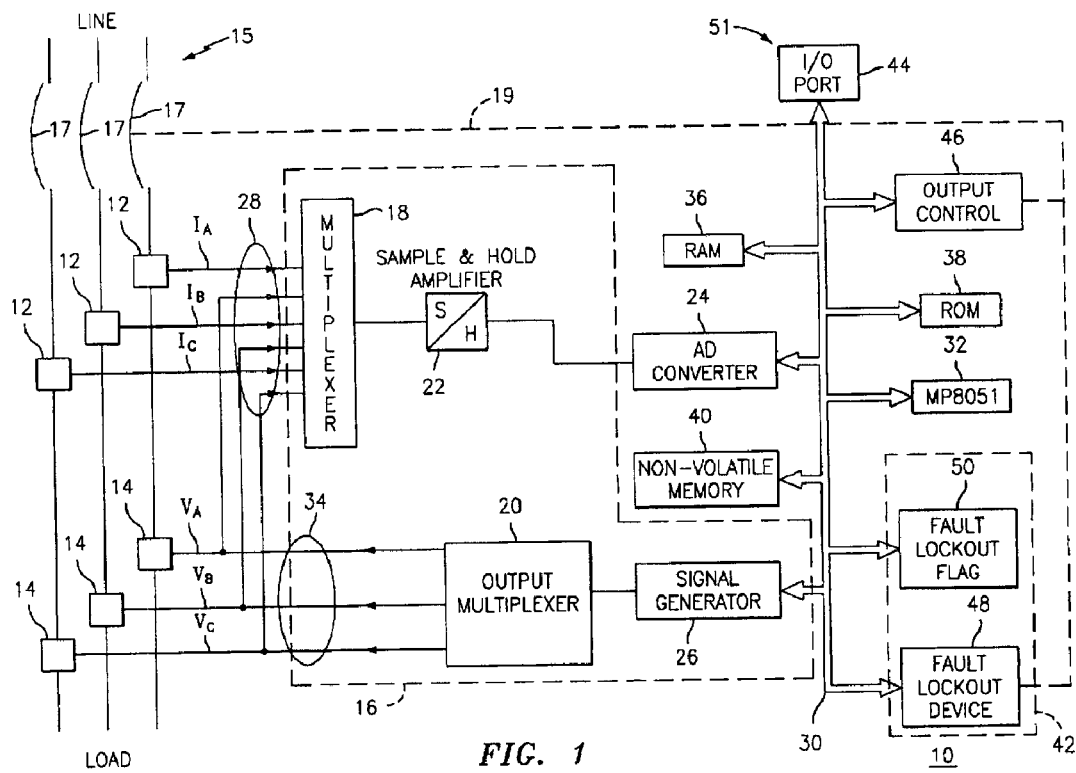
FIG. 1 is a schematic block diagram of a fault lockout controller.

FIG. 1 shows a fault lockout protection controller 10 for detecting the existence of a short circuit fault and preventing closure of an associated set of circuit breaker contacts if a short circuit fault has been detected. Fault lockout protection controller 10 uses a fault current detection method described within U.S. patent application Ser. No. 09/474,821 filed on Dec. 29, 1999, entitled "Fault Current Detection Meter and Method", which is incorporated by reference.

Fault lockout protection controller 10 is in the form of a printed circuit card with all the circuit components except the current transformers 12 and the potential transformers 14 mounted on circuit cards (not shown). Fault lockout controller 10 is contained within a circuit breaker enclosure along with the circuit breaker contacts and operating mechanism such as described within U.S. Pat. No. 4,754,247 entitled "Molded Case Circuit Breaker Accessory Enclosure", which is incorporated by reference.

One potential transformer 14 and one current transformer 12 are disposed about each phase of a three-phase power distribution system 15. Transformers 12 and 14 are located on the load-side of the circuit breaker contacts 17. Transformers 14 are arranged to inject a test voltage onto the load side of the distribution circuit 15. The test voltage is less than the line voltage (the voltage from the line side 15 of the electrical distribution circuit to ground). The test voltage induces a test current in each phase of the load side of the distribution circuit 15, which is sampled by transformers 12. Current transformers 12 provide a current signal indicative of the sampled test current to a conditioning circuit 16.

Conditioning circuit 16 includes multiplexers 18 and 20, a sample and hold amplifier 22, and a signal generator 26. Multiplexer 18 receives the current signals from transformers 12 via lines 28. Multiplexer 18 arranges the current signals in interleaved fashion, and provides a string of signals to a sample and hold amplifier 22. Sample and hold amplifier 22 amplifies the signals and then provides the string of signals to an analog to a digital (A/D) converter 24. A/D converter 24 converts the signals to square waveforms and provides the digitized signals to data bus 30. Signal generator 26 and output multiplexer 20 provide the voltage signal to be injected by transformers 14. Signal generator 26 receives digitized signals from a processor 32 via data bus 30 and outputs a string of voltage signals to output multiplexer 20. Output multiplexer 20 de-multiplexes the string of voltage signals, and provides the voltage signals to lines 34, where the voltage signals are received by transformers 14 to be injected on each phase of the power distribution circuit 15.

Data bus 30 allows data communications between A/D converter 24, microprocessor 32, RAM (random access memory) 36, signal generator 26, ROM (read only memory) 38, NVM (nonvolatile memory) 40, a fault lockout module 42, an I/O (input/output) port 44, and an output control module 46. Processor 32 receives the digitized signals output by A/D converter 24. Processor 32 stores these signals in its associated memory registers and executes instructions based on these signals and program instructions received from RAM 36 or ROM 38. Based on one or more of these inputs, processor 32 outputs a control signal to fault lockout module 42 or signal generator 26. Calibration, testing, programming and other features are accomplished through a communications I/O port 44, which communicates with microprocessor 32 via bus 30. ROM 38 includes fault lockout protection controller application code, e.g., main functionality firmware, including initializing parameters, and boot code. The application code further includes code for a fault lockout algorithm, described hereinafter. Non-volatile memory 40 may include, for example, EEPROM (electronic erasable programmable read only memory) for the storage of operational parameters such as electrical current and harmonic threshold settings, described hereinafter. Parameters in non-volatile memory 40 may be stored at the factory and are selected to meet customers" requirements, but can also be remotely downloaded through the I/O port 44A.

Fault lockout module 42 includes a fault lockout device 48 and a fault lockout flag 50. Fault lockout device 48 is arranged to receive a lockout signal from processor 32 via bus 30 and prevent the closure of the circuit breaker contacts 17 when the lockout signal is received. Fault lockout device 48 may comprise, for example, an electromechanical device, such as a solenoid that acts to physically restrain the circuit breaker contacts 17 via a mechanical link 19. Fault lockout flag 50 is arranged to receive the lockout signal from processor 32 via bus 30 and provide a signal to a remote indicator (not shown).

Preferably, data bus 30, microprocessor 32, RAM 36, ROM 38, NVM 40, analog to digital converter 24, and I/O port 44 form part of an electronic trip unit (circuit breaker controller) 51, such as that described in U.S. Pat. No. 4,672,501. The fault lockout controller 48 and fault lockout flag 50 are contained within module 42 for insertion in a separate compartment within the circuit breaker case, as described in aforementioned U.S. Pat. No. 4,754,247.

In operation, processor 32 provides an initiating signal indicative of a known frequency to signal generator 26 via data bus 30. Upon receipt of the initiating signal, signal generator 26 applies a string of signals to output multiplexer 20. Output multiplexer 20 de-multiplexes the string of signals and provides a test voltage signal to each voltage transformer 14 via lines 34. Transformers 14 inject these test voltage signals to each phase of the electrical distribution circuit. Processor 32 waits for a delay period to allow transient effects of the injected signals to settle, and then accepts the sampled test current signals provided by current transformers 12 through conditioning circuit 16. This process is repeated by injecting test voltages at different frequencies, which are selected by processor 32 based on stored instructions. Processor 32 uses the sampled signals to determine a representative current for the load side of the distribution circuit 15 and then compares the representative current with a predetermined current threshold value stored in non-volatile memory 40. If the current is above this threshold, processor 32 provides a lockout signal to the fault lockout device 48 and fault lockout flag 50. Upon receiving this lockout signal, fault lockout device 48 prevents the closure of the breaker contacts 17, and fault lockout flag 50 provides for remote indication of breaker lockout. If the current is below the threshold value, fault lockout device 48 is not activated, and the circuit breaker contacts 17 are allowed to close.

Alternatively, after processor 32 waits for the delay period to allow transient effects of the injected signals to settle, processor 32 then accepts the sampled current signals provided by current transformers 12 and sampled voltage signals provided by voltage transformers 14 through conditioning circuit 16. This process is repeated by injecting voltages at different frequencies, which are selected by processor 32 based on stored instructions. Processor 32 uses the sampled voltage and current signals to determine a representative impedance for the load side of the distribution circuit 15. The processor 32 can determine the impedance by dividing the root-mean-square (RMS) voltage by the RMS current. Processor 32 can also determine the phase angle between the current and the voltage, and can determine the resistance and inductance of the load side of the electrical distribution system at each frequency. After processor 32 determines the representative impedance, it then compares the representative impedance with a predetermined impedance threshold value stored in non-volatile memory 40. If the impedance is below this threshold, processor 32 provides a lockout signal to the fault lockout device 48 and fault lockout flag 50.

Figure 2:
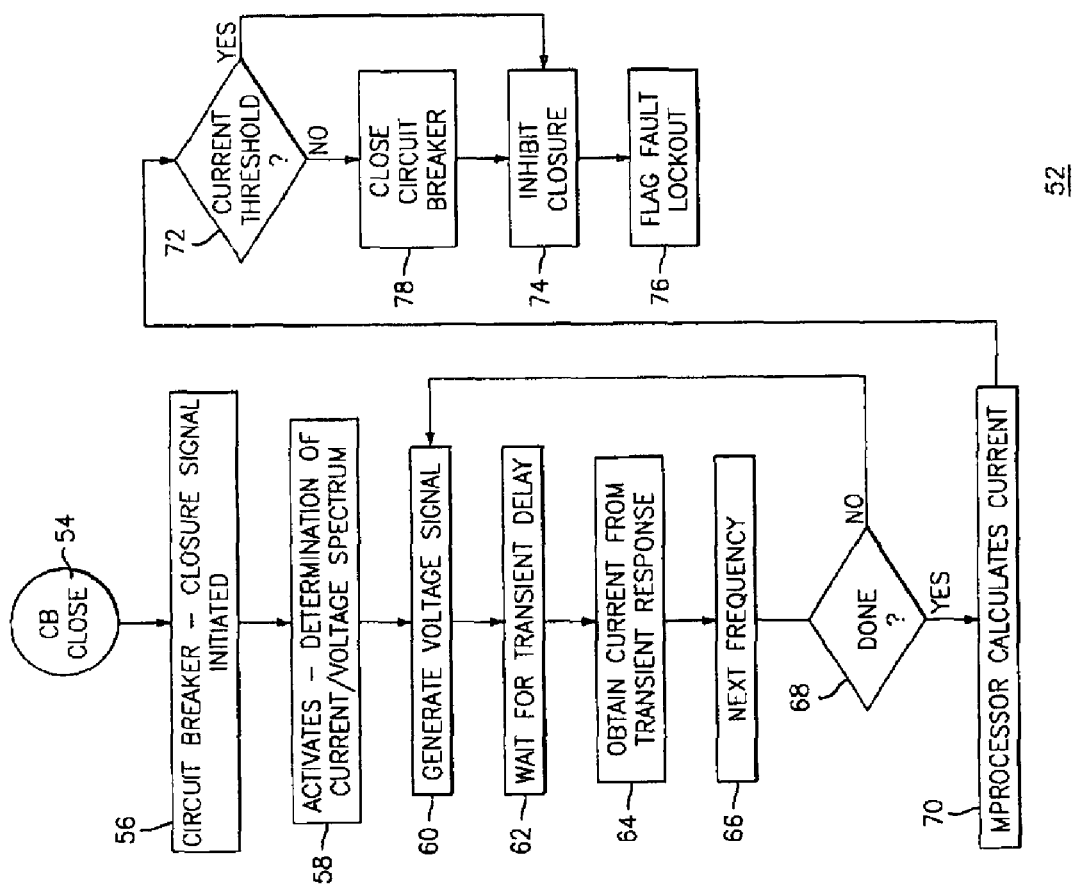
FIG. 2 is a flow diagram of the fault lockout algorithm for use in the circuit breaker controller of FIG. 1.

Referring to FIGS. 1 and 2, a fault lockout algorithm (52) for use in fault lockout protection controller 10 is shown. On initiating circuit breaker contact closure (54), the microprocessor 32 outputs a circuit breaker contacts closure signal (56). Because harmonic voltages and currents may already be present in the power system 15, errors can be introduced. To eliminate such errors, a scan of voltage and current harmonics is performed (58). The results of this scan are used by processor 32 to prevent the use of frequencies where significant harmonics (i.e. harmonics above a predetermined threshold value) are present. A predetermined frequency is then set to a minimum (first) value, such as 120 Hz or the second harmonic of a 60 Hz fundamental. If frequencies are to be scanned below the fundamental frequency, the sequence would begin with, for example, 30 Hz, continuing to 15, 7.5 Hz, etc. A test voltage signal of the predetermined frequency is then generated (60) and applied to each phase of the electrical distribution circuit. After the delay period has expired (62) an electrical current value is obtained from the electrical distribution circuit (64), and the frequency is changed (e.g., incremented to the next resonant frequency) (66). It is then determined whether the electrical distribution system 15 has been analyzed for all frequencies of interest (68). This can be performed, for example, by referring to instructions stored in the memory associated with processor 32. If additional relevant frequencies are to be analyzed, the process returns to (60), where another voltage signal is generated. If no additional frequencies are to be analyzed, microprocessor 32 calculates a representative current value for the electrical distribution system 15 using the test current values sampled at the various frequencies (70). The representative current value is then compared to a threshold current value (72). If there is no fault present, the circuit breaker contacts 17 are closed (78). If the representative current exceeds the current threshold value, indicating a fault in the load side of the electrical distribution circuit 15, the circuit breaker contacts 17 are inhibited from closing (74) and the existence of a fault is indicated (76). Thus, the breaker contacts 17 are prevented from closing onto high-level short circuit conditions.

Figure 3:
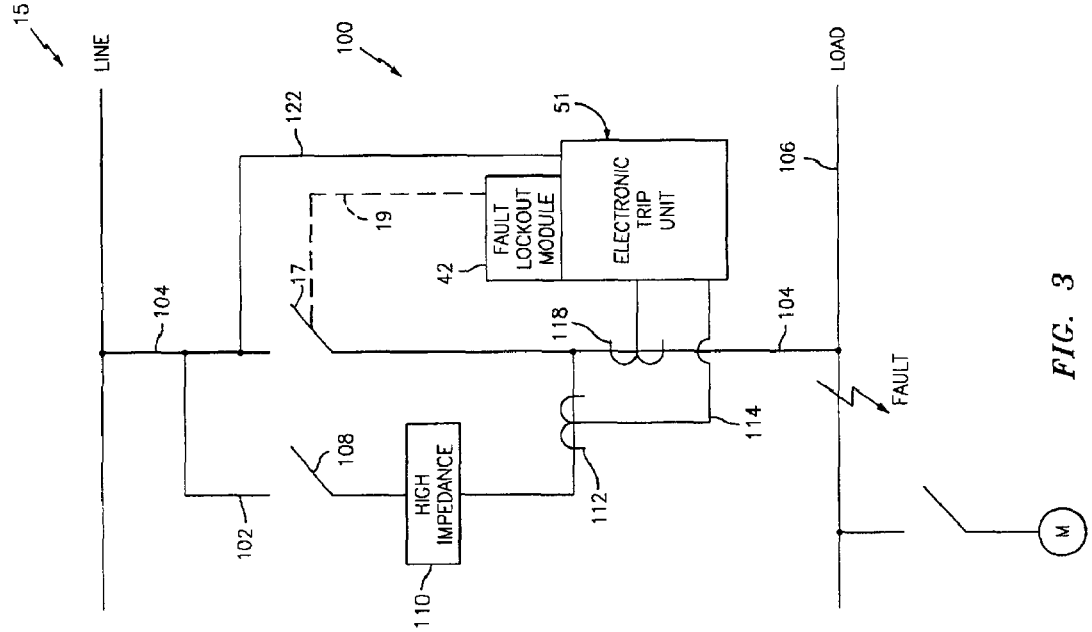
FIG. 3 is a schematic block diagram showing an alternate embodiment of a fault lockout controller.

FIG. 3 is a single line diagram for a fault lockout protection controller 100 according to another embodiment of the present invention. Fault lockout protection controller 100 includes a contact bypass line 102 connected parallel to a supply line 104 of a protected circuit 106 for providing a test voltage to the load side of the distribution circuit 15. Contact bypass line 102 includes an bypass switch 108 for interrupting the flow of electrical current in contact bypass line 102. Contact bypass line 102 also includes a high impedance device 110 for reducing the voltage on the load side of distribution circuit 15 to below line voltage. Line 102 further includes a current transformer 112 for providing a signal indicative of current in contact bypass line 102 (current signal) to a current sample line 114.

Supply line 104 includes main contacts 17 of a circuit breaker for interrupting the flow of electrical current in supply line 104. A current transformer 118 is disposed about supply line 104 for providing a signal indicative of the current in supply line 104 to an electronic trip unit 51. Electronic trip unit 51 senses current in supply line 104, and opens main contacts 17 on the presence of overcurrent in line 104, as described in aforementioned U.S. Pat. No. 4,672,501. Line 114 provides the current signal from current transformer 112 to electronic trip unit 51. A voltage sample line 122 provides a signal indicative of supply line 104 voltage (voltage signal) to the electronic trip unit 51. Electronic trip unit 51 is powered by voltage from the line side of supply line 104 or through an auxiliary power supply (not shown).

Prior to closing breaker contacts 17, bypass switch 108 is closed to allow test current to flow through contact bypass line 102. Current passing through contact bypass line 102 is sensed by current transformer 112, which provides the current signal indicative of the current through bypass line 102 to line 114. Electronic trip unit 51 receives the current signal from line 114. If the current signal received by electronic trip unit 51 indicates a current below a predetermined current threshold value, then the main contacts 17 are allowed to close. If the current signal received by electronic trip unit 51 indicates a current above the predetermined threshold value, indicating a short circuit on the load side of circuit, then a lockout signal is generated by the electronic trip unit 51 to prevent closure of the breaker contacts 17. Thus, the breaker contacts 17 are prevented from closing onto high-level short circuit conditions, and impedance device 110 protects the electronic trip unit 51 and current transformer 112 from the high currents associated with a short circuit. Additionally, the electronic trip unit 51 can generate an alarm activation/indication signal to indicate a short circuit.

In an alternate embodiment, current transformer 118 senses current passing through contact bypass line 102 to provide a signal indicative of this sensed current to the electronic trip unit 51. In this embodiment, current transformer 112 and line 114 are not needed.

Figure 4:
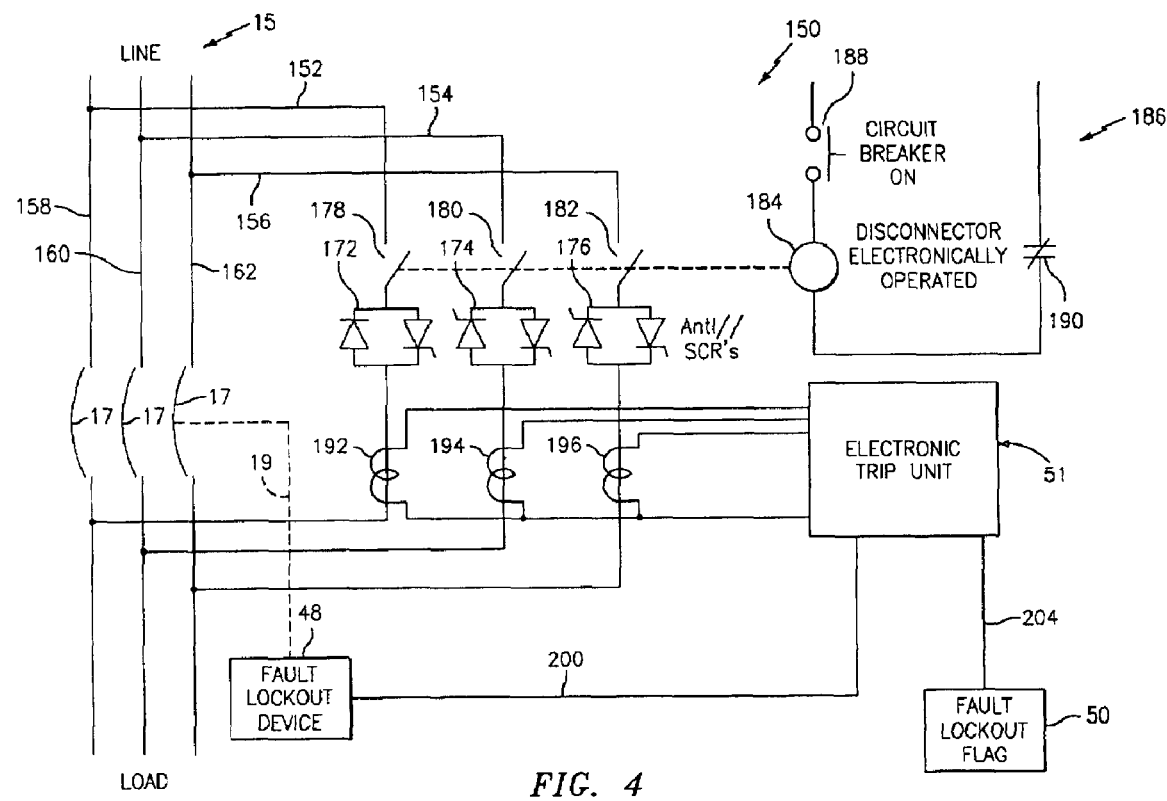
FIG. 4 is schematic block diagram showing another alternate embodiment of a fault lockout controller.

FIG. 4 shows a fault lockout protection controller 150 according to another embodiment of the present invention. In FIG. 4, contact bypass lines 152, 154, 156 are connected parallel to supply lines 158, 160, 162, respectively, to provide test voltage to the load side of distribution circuit 15. Supply lines 158, 160, 162 include main contacts 17 for interrupting the flow of electrical current in supply lines 158, 160, 162. Main contacts 17 are controlled by an electronic trip unit 51 such as that described in aforementioned U.S. Pat. No. 4,672,501. Each contact bypass line 152, 154, 156 includes silicon controlled rectifiers in anti-parallel pairs 172, 174, 176 and an bypass switch 178, 180, 182. Silicon controlled rectifiers (SCRs) 172, 174, 176 are arranged to ramp-up the voltage in contact bypass lines 152, 154, 156, respectively, over time. SCRs 172, 174, 176 control the voltage in lines 152, 154, 156 by allowing passage of current in contact bypass lines 152, 154, 156 after "θ" radians past the start of each positive cycle of the current wave. In other words, SCRs 172, 174, 176 allow part of each current wave to pass. SCRs 172, 174, 176 ramp-up the voltage by decreasing θ over time, thus allowing more of the current wave to pass. For example, SCRs 172, 174, 176 can be arranged to increase the test voltage from zero volts to some predetermined voltage (e.g. line voltage) over several cycles. Bypass switches 178, 180, 182 are arranged to allow the flow of electrical current in contact bypass lines 152, 154, 156, respectively, immediately before breaker closing. Bypass switches 178, 180, 182 are operated by a disconnector 184 included in a starter circuit 186. Starter circuit 186 also includes a normally open activation switch 188 and a normally closed bypass switch 190, which are connected in series to disconnector 184. Starter circuit 186 receives power from an auxiliary source (not shown).

Disposed about each contact bypass line 152, 154, 156 are current transformers 192, 194, 196, respectively. Current transformers 192, 194, 196 sense the electrical current in contact bypass lines 152, 154, 156 and provide a signal indicative of this sensed current (current signal) to the electronic trip unit 51.

Electronic trip unit 51 is arranged to provide a lockout signal to a fault lockout device 48 via a line 200 and to a fault lockout flag 50 via a line 204. Fault lockout device 48 is arranged to prevent the closure of contacts 17 when the lockout signal is received. Fault lockout device comprises, for example, an electromechanical device, such as a solenoid, connected to contacts 17 via a mechanical link 19. Fault lockout flag 50 is arranged to provide a signal to a remote indicator (not shown) when the lockout signal is received.

To close circuit breaker, the activation switch 188 is depressed, providing electrical current to disconnector 184. When energized, disconnector 184 acts to close bypass switches 178, 180, 182. Bypass switches 178, 180, 182 allow a test current to pass on contact bypass lines 152, 154, 156 from the line side of breaker contacts 17 to the load side of breaker contacts 17 through SCRs 172, 174, 176. SCRs 172, 174, 176 gradually increase voltage over time, thus eliminating the switching transient current on contact bypass lines 152, 154, 156. Electronic trip unit 51 receives current signals from transformers 192, 194, 196, and determines a load side current value from the current signals. If the current value determined by electronic trip unit 51 is below a predetermined threshold value, indicating no fault, then voltage on lines 152, 154, 156 is ramped up to its full, predetermined voltage by SCRs 172, 174, 176 and the main contacts 17 are allowed to close. Alternatively, if the current value determined by electronic trip unit 51 is below the predetermined threshold value, indicating no fault, then the main contacts 17 are allowed to close and voltage on lines 152, 154, 156 is ramped up to its full, predetermined voltage by SCRs 172, 174, 176. If the current value is above a predetermined current threshold value, indicating a short circuit on the load side of circuit 15, then a lockout signal is provided by the electronic trip unit 51 to fault lockout device 48, preventing closure of the breaker contacts 17. Thus, the breaker contacts 17 are prevented from closing onto high-level short circuit conditions, and SCRs 172, 174, 176 protect the electronic trip unit 51 from the high currents associated with a short circuit. Additionally, the electronic trip unit 51 provides the lockout signal to fault lockout flag 50, which provides for remote indication of the fault condition.

A circuit breaker having a fault lockout protection controller has herein been described for preventing closure of the breaker contacts onto high-level short circuit conditions. Because the possibility of closure onto short circuit conditions is eliminated, there is no longer a need for the stronger latching mechanism and tighter tolerances required to compensate for the high fault currents associated with closing onto a short circuit condition. As a result, a lower cost, lighter, faster circuit breaker contacts and closing mechanism that allows the circuit breaker to open and interrupt overcurrent fault currents more efficiently is provided.

Figure 5:
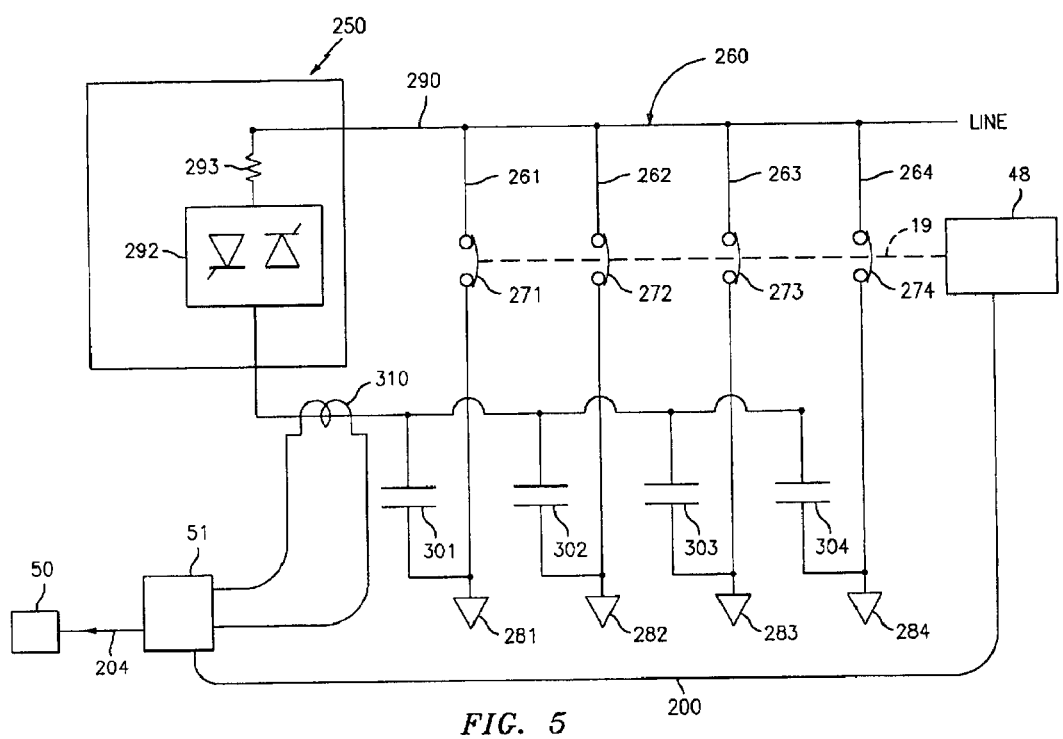
FIG. 5 is schematic block diagram showing an exemplary embodiment of a multiple circuit fault lockout protection controller.

Referring now to FIG. 5, an exemplary embodiment of a multiple circuit fault lockout protection controller is illustrated. FIG. 5 is a single line diagram illustrating fault lockout protection controller 250 applied to a common or shared busbar electrical distribution system 260. For purposes of clarity, fault lockout protection controller 250 is described by way of example as fault lockout protection controller 150 described in detail above with respect to FIG. 4. Of course, and as applications require, fault lockout protection controller 250 being fault lockout protection controllers 10 and 100, or combinations of fault lockout protection controllers 10, 100, and 150 is considered within the scope of the present invention.

Busbar system 260 feeds circuits 261, 262, 263, and 264. Each of circuits 261, 262, 263, and 264 includes a circuit breaker contact and a load device, namely circuit breaker contacts 271, 272, 273, and 274 and load devices 281, 282, 283, and 284, respectively. Of course, and as applications require, use of more or less than four circuits, and thus more or less circuit breaker contacts and load devices, is considered within the scope of the present invention.

Circuit breaker contacts 271, 272, 273, and 274 have a closed position electrically coupling load devices 281, 282, 283, and 284 to line power in busbar system 260, and have an open position disconnecting load devices 281, 282, 283, and 284 from line power in the busbar system.

Busbar system 260 also includes a contact bypass line 290 having silicon controlled rectifier (SCR) 292 and an bypass switch for each of circuits 261, 262, 263, and 264, namely bypass switches 301, 302, 303, and 304. SCR 292 is arranged to ramp-up the voltage in contact bypass line 290 over time.

SCR 292 controls the voltage in contact bypass line 290 by allowing passage of current in the contact bypass lines after "θ" radians past the start of each positive cycle of the current wave. Thus, SCR 292 allows part of each current wave to pass. SCR 292 ramps-up the voltage by decreasing θ over time, thus allowing more of the current wave to pass.

For example in a first embodiment, SCR 292 is arranged to increase the test voltage from zero volts to line voltage over several cycles. Bypass switches 301, 302, 303, and 303 are arranged to allow the flow of electrical current in contact bypass line 290 to devices 281, 282, 283, and 284, respectively, immediately before breaker (e.g., 271, 272, 273, and 274) closing.

Devices 281, 282, 283, and 284 are operated by a controller (not shown) included in a device control circuit (not shown). Similarly, bypass switches 301, 302, 303, and 304 are operated by the controller included in the device control circuit. Thus, in order to activate one of devices 281, 282, 283, or 284, the user provides an input to the device control circuit to close a corresponding bypass switch 301, 302, 303, or 304, respectively.

Disposed about contact bypass line 290 is a current transformer 310. Current transformer 310 senses the electrical current in contact bypass line 290 and provides a signal indicative of this sensed current (current signal) to the electronic trip unit 51.

Electronic trip unit 51 is arranged to provide a lockout signal to a fault lockout device 48 via a line 200 and to a fault lockout flag 50 via a line 204. Fault lockout device 48 is arranged to prevent the closure of any of contacts 271, 272, 273, and 274 when the lockout signal is received. Fault lockout device comprises, for example, an electromechanical device, such as a closing release solenoid, connected to contacts 271, 272, 273, and 274 via a mechanical link 19, such as a stored energy spring system. Fault lockout flag 50 is arranged to provide a signal to a remote indicator (not shown) when the lockout signal is received.

Thus with one of the bypass switches 301, 302, 303, or 304 closed, fault lockout protection controller 250 allows a test current to pass on contact bypass line 290 from the line side of one of the breaker contacts 271, 272, 273, and 274 to the load side of that breaker contacts (e.g., to one of devices 281, 282, 283, or 284) through SCR 292. SCR 292 gradually increases voltage over time to line voltage, thus eliminating the switching transient current on contact bypass line 290. Electronic trip unit 51 receives current signals from transformer 310, and determines a load side current value from the current signals.

If the current value determined by electronic trip unit 51 is below a predetermined threshold value, indicating no fault in the device, then voltage on by pass line 290 is ramped up to its full, line voltage by SCR 292, at which point the particular contact (e.g., 271, 272, 273, or 274) is allowed to close and the particular bypass switch (e.g., 301, 302, 303, or 304) is opened. Thus if no fault is detected, then the voltage in the particular circuit (e.g., 261, 262, 263, or 264) is ramped up to its full, line voltage by SCR 292 at which point the particular contact (e.g., 271, 272, 273, or 274) is allowed to close either before or after the particular bypass switch (e.g., 301, 302, 303, or 304) is opened. Preferably, the particular contact (e.g., 271, 272, 273, or 274) is allowed to close after the particular bypass switch (e.g., 301, 302, 303, or 304) is opened.

However, if the current value is above a predetermined current threshold value, indicating a short circuit and the like on the load or device side of the particular circuit (e.g., 261, 262, 263, or 264), then a lockout signal is provided by the electronic trip unit 51 to fault lockout device 48, preventing closure of the particular contact (e.g., 271, 272, 273, or 274).

In an alternate embodiment also shown in FIG. 5, SCR 292 further includes an impedance 293. Here, SCR 292 due to impedance 293 is arranged to increase the test voltage from zero volts to less than line voltage over several cycles. In this embodiment, if the current value determined by electronic trip unit 51 is below a predetermined threshold value, indicating no fault in the device, then the particular contact (e.g., 271, 272, 273, or 274) is allowed to close either before or after the particular bypass switch (e.g., 301, 302, 303, or 304) is opened. Preferably, the particular contact (e.g., 271, 272, 273, or 274) is allowed to close after the particular bypass switch (e.g., 301, 302, 303, or 304) is opened. Thus, if no fault is detected, then the particular contact (e.g., 271, 272, 273, or 274) is allowed to close and the particular bypass switch (e.g., 301, 302, 303, or 304) is opened.

Thus, fault lockout protection controller 250 prevents the breaker contacts (e.g., 271, 272, 273, or 274) are from closing onto high-level short circuit conditions, and SCR 292 protects the electronic trip unit 51 from the high currents associated with a short circuit. Additionally, the electronic trip unit 51 provides the lockout signal to fault lockout flag 50, which provides for remote indication of the fault condition.

In this manner, fault lockout protection controller 250 provides a safety interlock circuit wherein each circuit (e.g., 261, 262, 263, or 264) is tested, independently and sequentially from the other circuits prior to closing the contact (e.g., 271, 272, 273, or 274) for that circuit. By way of example, fault lockout protection controller 250 provides a safety interlock circuit by ensuring that no more than one bypass switch (e.g., 301, 302, 303, or 304) is open at a time.

Accordingly, and in this manner, fault lockout protection controller 250 protects multiple feeder circuits fed from a shared electrical distribution system.

Fault lockout protection controller 250 is adapted to be applied to high, medium, or low voltage busbar systems, such as, but not limited to switchgear and switchboards.

Figure 6:
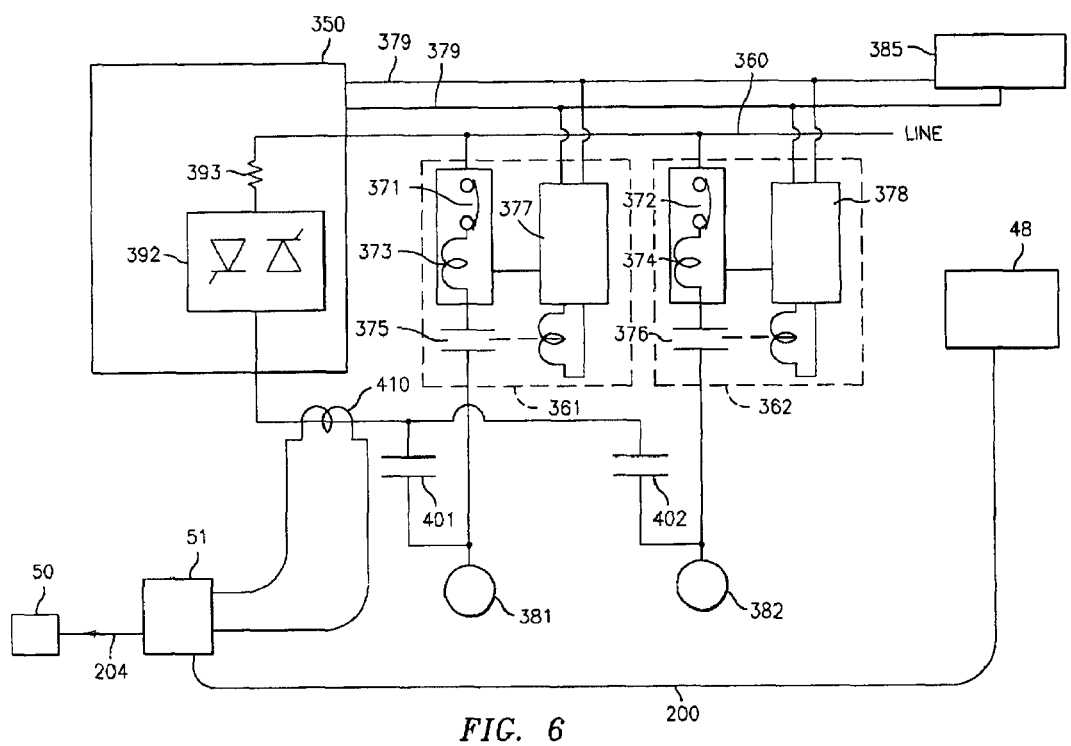
FIG. 6 is schematic block diagram showing an exemplary embodiment of a motor control center fault lockout protection controller.

Referring now to FIG. 6, an exemplary embodiment of a motor control center fault lockout protection controller is illustrated. FIG. 6 is a single line diagram illustrating fault lockout protection controller 350 applied to a common or shared electrical distribution system or busbar system 360. For purposes of clarity, fault lockout protection controller 350 is described byway of example as fault lockout protection controller 150 described in detail above with respect to FIG. 4. Of course, and as applications require, fault lockout protection controller 350 being fault lockout protection controllers 10 and 100, or combinations of fault lockout protection controllers 10, 100, and 150 is considered within the scope of the present invention.

Busbar system 360 feeds motor starters 361 and 362 connected to motors 381 and 382, respectively. By way of example, each of motor starter 361 and 362 includes a circuit breaker contact 371 and 372, a current transformer 373 and 374, a contactor 375 and 376, and an electronic control module (ECM) 377 and 378. Of course, it should be recognized that the motor starter is described above by way of example only. Additionally, use of more or less than two motors, and thus more or less motor starters, is also considered within the scope of the present invention.

Circuit breaker contacts 371 and 372 have a closed position electrically coupling motors 381 and 382 to line power in busbar system 360, and have an open position disconnecting the motors from line power in the busbar system. Circuit breaker contacts 371 and 372 are in a normally closed position and are adapted to open in the event of a short circuit condition.

ECM 377 and 378 communicates with fault lockout protection controller 350 via communication lines 379.

Moreover, ECM 377 and 378 includes an electronic motor protection relay adapted to open and close contactors 375 and 376. Here, the ECM monitors the load indicated by current transformer 373 and 374. If the load drawn by motors 381 and 382 exceeds a predetermined level, ECM disconnects the motor from busbar system 360 by opening the particular contactor 375 and 376.

Busbar system 360 also includes a contact bypass line 390 having silicon controlled rectifier (SCR) 392 and an bypass switch for each of motor starters 361 and 362, namely bypass switches 401 and 402. SCR 392 is arranged to ramp-up the voltage in contact bypass line 390 over time.

SCR 392 controls the voltage in contact bypass line 390 by allowing passage of current in the contact bypass lines after "θ" radians past the start of each positive cycle of the current wave. Thus, SCR 392 allows part of each current wave to pass. SCR 392 ramps-up the voltage by decreasing θ over time, thus allowing more of the current wave to pass.

In a first embodiment, SCR 392 is arranged to increase the test voltage from zero volts to line voltage over several cycles. Bypass switches 401 and 402 are arranged to allow the flow of electrical current in contact bypass line 390 to motors 381 and 382, respectively, immediately before contact (e.g., 371 and 372) closes.

Motors 381 and 382 are operated by a logic sequence controller 385, such as but not limited to programmable logic controller, computers, and the like. Similarly, bypass switches 401 and 402 are operated by logic sequence controller 385. Thus, in order to activate one of motors 381 or 382, the user provides an input to logic sequence controller 385 to close a corresponding bypass switch 401 or 402, respectively.

Disposed about contact bypass line 390 is a current transformer 410. Current transformer 410 senses the electrical current in contact bypass line 390 and provides a signal indicative of this sensed current (current signal) to the electronic trip unit 51.

Electronic trip unit 51 is arranged to provide a lockout signal to a fault lockout device 48 via a line 200 and to a fault lockout flag 50 via a line 204. Fault lockout device 48 is arranged to prevent the closure of any of contactors 375 and 376 when the lockout signal is received. Fault lockout device comprises, for example, an electromechanical device, such as a solenoid, connected to contactors 375 and 376 via a mechanical link (not shown). Fault lockout flag 50 is arranged to provide a signal to a remote indicator (not shown) when the lockout signal is received.

Thus with one of the bypass switches 401 or 402 closed, fault lockout protection controller 350 allows a test current to pass on contact bypass line 390 from the line side of one of the contactors 375 and 376 to the load side of that contactor (e.g., to one of motors 381 or 382) through SCR 392. SCR 392 gradually increases voltage over time, thus eliminating the switching transient current on contact bypass line 390. Electronic trip unit 51 receives current signals from transformer 410, and determines a load side current value from the current signals.

If the current value determined by electronic trip unit 51 is below a predetermined threshold value, indicating no fault in the device, then voltage on by pass line 390 is ramped up to its full, line voltage by SCR 392, at which point the particular contactor (e.g., 375 or 376) is allowed to close and the particular bypass switch (e.g., 401 or 402) is opened. Thus if no fault is detected, then the voltage to the particular motor (e.g., 381 or 382) is ramped up to its full, line voltage by SCR 392 at which point the particular contactor (e.g., 375 or 376) is allowed to close either before or after the particular bypass switch (e.g., 401 or 402) is opened. Preferably, the particular contactor (e.g., 375 or 376) is allowed to close after the particular bypass switch (e.g., 401 or 402) is opened.

However, if the current value is above a predetermined current threshold value, indicating a short circuit or fault on the load or motor side, then a lockout signal is provided by the electronic trip unit 51 to fault lockout device 48, preventing closure of the particular contactor (e.g., 375 or 376).

In an alternate embodiment also shown in FIG. 6, SCR 392 further includes an impedance 393. Here, SCR 392 due to impedance 393 is arranged to increase the test voltage from zero volts to less than line voltage over several cycles. In this embodiment, if the current value determined by electronic trip unit 51 is below a predetermined threshold value over the several cycles, indicating no fault in the device, then the particular contactor (e.g., 375 or 376) is allowed to close and the particular bypass switch (e.g., 401 or 402) is opened. However, if the current value is above a predetermined current threshold value, indicating a short circuit or fault on the load or motor side, then a lockout signal is provided by the electronic trip unit 51 to fault lockout device 48, preventing closure of the particular contactor (e.g., 375 or 376). Thus, fault lockout protection controller 350 prevents the contactor (e.g., 375 or 376) from closing onto high-level short circuit conditions, and SCR 392 protects the electronic trip unit 51 from the high currents associated with a short circuit. Additionally, the electronic trip unit 51 provides the lockout signal to fault lockout flag 50, which provides for remote indication of the fault condition. Accordingly, and in this manner, fault lockout protection controller 350 protects multiple motors fed from a common bus bar system.

Here, fault lockout protection controller 350 provides a safety interlock circuit wherein each motor (e.g., 381 or 382) is tested, independently and sequentially from the other motors prior to closing the contactor (e.g., 375 or 376) for that motor. By way of example, fault lockout protection controller 350 provides a safety interlock circuit by ensuring that no more than one bypass switch (e.g., 401 or 402) is open at a time.

Figure 7:
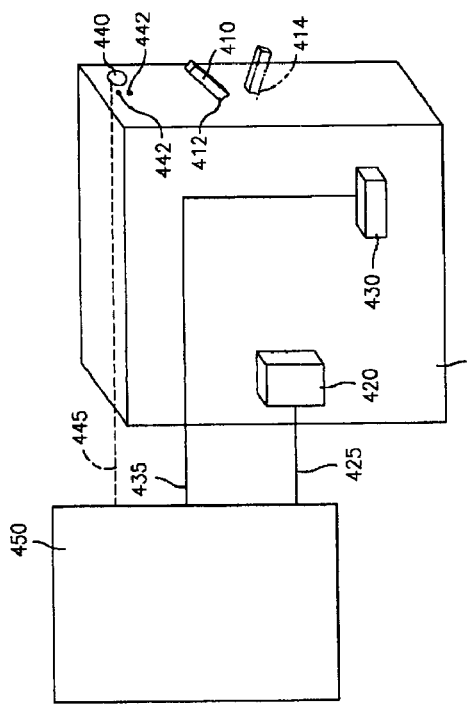
FIG. 7 is schematic block diagram showing a molded case circuit breaker having a fault lockout protection controller.

Referring now to FIG. 7 is schematic block diagram showing a molded case circuit breaker 400 having a fault lockout protection controller 450. Here, fault lockout protection controller 450 is a fault lockout protection controller 10, 100, or 150 as described above.

Molded case circuit breaker 400 includes an over-center toggle mechanism 410. Over-center toggle mechanism 410 is adapted to move between an open 412 position (shown in solid lines) and a closed position 414 (shown in dotted lines), which in turn moves breaker contacts (not shown) between an open and a closed position. For example, over-center toggle mechanism 410 is as described in U.S. Pat. No. 4,754,247.

Molded case circuit breaker 400 also includes an under voltage protection module 420. Module 420 is an undervoltage kiss free accessory that provides breaker 400 with kiss free fault-lockout means. For example, under voltage protection module 420 is as described in U.S. Pat. No. 4,301,434 entitled "Under Voltage Release Reset And Lockout Apparatus". Of course, over-center toggle mechanism 410 and/or under voltage protection module 420 are described herein by way of example only. Other over-center toggle mechanism 410 and/or under voltage protection module 420, which provide operate the circuit breaker and protect from under voltage conditions, are considered within the scope of the present invention.

Breaker 400 also includes a blocking solenoid module 430. Under voltage protection module 420 and blocking solenoid module 430 communicate with fault lockout protection controller 450 by way of lines 425 and 435, respectively.

Figure 8:
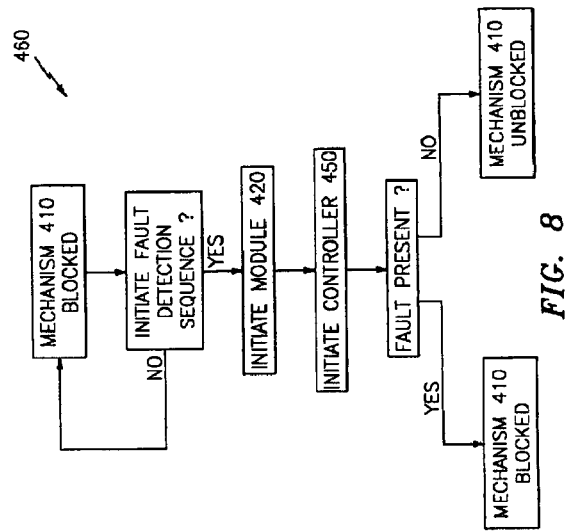
FIG. 8 is a flow diagram of the fault detection sequence of the circuit breaker of FIG. 7.

Blocking solenoid module 430 is adapted to block or restrain movement of mechanism 410 from open position 412 to closed position 414 until controller 450 has completed a fault detect sequence 460, illustrated in FIG. 8, has been completed. Thus, prior to moving mechanism 410 from open position 412 to closed position 414, fault detect sequence 460 is initiated. By way of example, breaker 400 includes a fault detect sequence initiation mechanism 440, such as a button, switch, or the like, communicating with controller 450 by way of lines 445. Optionally, mechanism 440 includes one or more indicator lights 442 is arranged to receive fault lockout flag 50 to provide a signal indicative of the "fault" or "ready" condition of breaker 400.

Actuating mechanism 440 initiates fault detect sequence 460 in module 420 and controller 450. Here, controller 450 determines a representative current for the load side of breaker 400 and/or determines a representative impedance for the load side of the breaker. Similarly, module 420 determines a representative voltage for the line side of breaker 400. If the current, impedance or voltage is out of acceptable limits or acceptable signature profile (hereinafter "limit"), blocking solenoid 430 remains closed to as to restrict movement of mechanism 410, and light 442 provides a signal indicative of the "fault" condition. Thus, in the event of fault conditions the breaker contacts of breaker 400 are not allowed to close due to mechanism 410 being blocked by solenoid 430.

However, if the current, impedance and voltage are within the acceptable limits/profile, blocking solenoid 430 is opened to permit movement of mechanism 410, and light 442 provides a signal indicative of the "ready" condition. Thus where no fault conditions exist, the breaker contacts of breaker 400 are closeable by movement of mechanism 410.

It should be recognized that breaker 400 is described above as including both under voltage protection module 420 and blocking solenoid module 430. However, breaker 400 having only under voltage protection module 420 or blocking solenoid module 430 is also considered. In the event that only under voltage protection module 420 is present, since the module provides breaker 400 with kiss free fault-lockout means, controller 450 communicates with the module in the event of a fault such that even if mechanism 410 were to be moved from open position 412 to closed position 414, the breaker contacts would not close. In the event that only blocking solenoid module 430 is present, controller 450 communicates with the module in the event of a fault such that mechanism 410 is blocked from moving from open position 412 to closed position 414.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of protecting multiple feeder circuits fed from a shared electrical distribution system, comprising:

providing a bypass line, said bypass line being configured to bypass corresponding separable circuit breaker contacts in each of a plurality of feeder circuits between a load side and a line side of the electrical distribution system;

providing bypass switches in said bypass line, said bypass switches being configured to selectively couple each of the feeder circuits one at a time to said bypass line;

providing a fault lockout protection controller coupled to said bypass line;

controlling said fault lockout protection controller to detect the existence of a fault condition on said load side of the feeder circuit selectively coupled to said bypass line prior to closing said corresponding separable circuit breaker contacts of the selectively coupled feeder circuit by providing a test voltage to said load side to induce a test current in said load side, said test voltage being less than a voltage in said line side; and controlling said fault lockout protection controller to prevent closure of said corresponding separable circuit breaker contacts upon detection of said fault condition.

2. The method of claim 1, wherein controlling said fault lockout protection controller to detect the existence of said fault condition further comprises:

sensing said test current to provide a sensed signal indicative of an electrical characteristic of said test current; and comparing said sensed signal to a predetermined value, said fault condition being present if said predetermined value is met.

3. The method of claim 2, wherein comparing said sensed signal to a predetermined value comprises:

calculating a load side current in response to said sensed signal; and comparing said load side current to a predetermined current threshold.

4. The method of claim 2, wherein providing said test voltage comprises:

providing a silicon controlled rectifier in said bypass line, said silicon controlled rectifier for ramping up voltage in said bypass line.

5. The method of claim 4, further comprising:

providing an impedance device in said bypass line prior to said silicon controlled rectifier, said impedance device for reducing voltage in said bypass line below voltage of said line side.

6. The method of claim 2, further comprising:

providing an impedance device in said bypass line, said impedance device for reducing voltage in said bypass line below voltage of said line side.

7. The method of claim 2, wherein sensing said test current comprises:

providing a current transformer about said bypass line, said current transformer for sensing said test current in said bypass line.

8. The method of claim 2, wherein providing said test voltage comprises:

generating said test voltage signal in said bypass line from a signal generator coupled to a voltage transformer.

9. An electric motor control center, comprising
a plurality of electric motors;
a motor starter for each electric motor of said plurality of electric motors, said plurality of electric motors being electrically connectable to a common electrical distribution system by a corresponding motor starter;
a bypass line, said bypass line being configured to bypass each said motor starter between a load side and a line side of said common electrical distribution system;
bypass switches in said bypass line, each of said bypass switches being configured to selectively couple said each electric motor one at a time to said bypass line;
a logic sequence controller, said logic sequence controller being configured to selectively control opening and closing each of said motor starters and said bypass switches; and
a fault lockout protection controller coupled to said bypass line, said fault lockout protection being configured to selectively detect the existence of a fault condition on said load side at said each electric motor prior to closing said corresponding motor starter, and to selectively prevent closure of each said corresponding motor starter for each of said plurality of electric motors upon detection of said fault condition.

10. The electric motor control center of claim 9, wherein said fault lockout protection controller detects said fault condition when selectively coupled to a corresponding electric motor by said logic sequence controller closing a corresponding bypass switch.

11. The electric motor control center of claim 10, wherein said fault lockout protection controller:
provides a test voltage to said load side to induce a test current in said load side;
senses said test current to provide a sensed signal indicative of an electrical characteristic of said test current; and
compares said sensed signal to a predetermined value, said fault condition being present if said predetermined value is met.

12. The electric motor control center of claim 11, further comprising a silicon controlled rectifier to provide said test voltage.

13. The electric motor control center of claim 12, further comprising a current transformer about said bypass line, said current transformer for sensing said test current in said bypass line.

14. The electric motor control center of claim 13, wherein said silicon controlled rectifier further includes an impedance device being positioned in said bypass line to reduce voltage in said bypass line below voltage of said line side.

15. The electric motor control center of claim 11, further comprising:
a signal generator, said signal generator being configured to generate a voltage signal; and
a voltage transformer arranged to provide said test voltage to said load side in response to said voltage signal.

16. The electric motor control center of claim 11, further comprising:
a current transformer about said bypass line, said current transformer for sensing said test current to provide said sensed signal indicative of said electrical characteristic of said test current to an electronic trip unit operatively coupled to said motor starter.

17. A circuit breaker, comprising:
an over-center toggle mechanism, said over-center toggle mechanism being configured to move between an open position and a closed position;
separable breaker contacts movable by said over-center toggle mechanism between said open position and said closed position, said separable breaker contacts being configured to connect a load side to a line side of an electrical distribution system in said closed position and to disconnect said load side from said line side in said open position;
a fault lockout protection controller, said fault lockout protection controller being configured to detect the existence of a fault condition on said load side by providing a test voltage to said load side to induce a test current in said load side, said test voltage being less than a voltage in said line side, and including means for preventing closure of said separable breaker contacts upon detection of said fault condition.

18. The circuit breaker of claim 17, further comprising:
a bypass line, said bypass line being configured to bypass said separable breaker contacts; and
a bypass switch, said bypass switch being positioned in said bypass line for coupling said fault lockout protection controller to said load side.

19. The circuit breaker of claim 18, wherein said means for preventing closure of said separable breaker contacts is selected from the group consisting of an under voltage protection module and a blocking solenoid module.

20. The circuit breaker of claim 18, further comprising:
means for actuating said bypass switch to couple said fault lockout protection controller to said load side.

21. A method of protecting a feeder circuit, comprising:
blocking corresponding separable contacts of each feeder circuit of a plurality of feeder circuits in an electrical distribution system from closing;
initiating a fault detection sequence in a fault lockout protection controller, said fault lockout protection controller being configured to detect the existence of a fault condition on a load side of each of said corresponding separable contacts by providing a test voltage to said load side to induce a test current in said load side, said test voltage being less than a voltage in a line side;
maintaining said corresponding separable contacts blocked from closing upon detection that said fault condition is present; and
unblocking said corresponding separable contacts from closing upon detection that said fault condition is not present.

22. The method of claim 21, wherein said blocking corresponding separable contacts of said each feeder circuit of said plurality of feeder circuits in said electrical distribution system from closing comprises:
providing means for preventing closure of said corresponding separable beaker contacts selected from the group consisting of an under voltage protection module and a blocking solenoid module.

23. The method of claim 21, wherein detecting the existence of a fault condition on said load side comprises:
sensing said test current to provide a sensed signal indicative of an electrical characteristic of said test current; and
comparing said sensed signal to a predetermined value, said fault condition being present if said predetermined value is met.

24. The method of claim 23, wherein providing said test voltage comprises:

provide a silicon controlled rectifier in a bypass line connected to said load side.

25. The method of claim 24, wherein sensing said test current comprises:

providing a current transformer about said bypass line, said current transformer for sensing said test current in said bypass line.

26. The method of claim 23, wherein providing said test voltage comprises:

generating said test voltage signal in a bypass line connected to said load side, said test voltage being generated by a signal generator coupled to a voltage transformer.

* * * * *